United States Patent [19]
Stauffer

[11] 3,838,275
[45] Sept. 24, 1974

[54] DETECTING APPARATUS FOR DETERMINING WHEN IMAGE IS IN FOCUS

[75] Inventor: Norman L. Stauffer, Englewood, Colo.

[73] Assignee: Honeywell, Inc., Minneapolis, Minn.

[22] Filed: July 18, 1973

[21] Appl. No.: 380,377

[52] U.S. Cl................ 250/204, 250/209, 250/234, 95/44 C, 352/140
[51] Int. Cl.............................................. G01j 1/36
[58] Field of Search .......... 250/204, 234, 208, 209, 250/201; 95/44 A, 44 C; 352/140; 356/125

[56] References Cited
UNITED STATES PATENTS

| | | | |
|---|---|---|---|
| 3,325,647 | 6/1967 | Sugier | 250/204 |
| 3,553,455 | 1/1971 | Sato | 250/209 |
| 3,634,689 | 1/1972 | Hachioji-Shi | 250/201 |
| 3,764,213 | 10/1973 | O'Meara | 250/204 X |

*Primary Examiner*—Walter Stolwein
*Attorney, Agent, or Firm*—Arthur H. Swanson; Lockwood D. Burton

[57] ABSTRACT

A focus detecting system includes first and second lens devices for forming first and second auxiliary images of an object on first and second detector devices, respectively. Each detector device includes a plurality of linearly displaced light responsive elements. One of the lens devices is movable with respect to its associated detector device to shift the light distribution pattern of the corresponding auxiliary image in the direction of linear displacement of the light responsive elements. The movable lens device is so coupled to a movable objective lens, which focusses a principal image of the object on a light sensitive film, that when the principal image is in focus, the light distribution ppatterns of the first and second images will be correspondingly positioned with respect to the first and second detector devices, respectively. A reference signal of a predetermined frequency controls a switching circuit to compare the electrical signals from the light responsive elements in the first detector device, alternately, at the predetermined frequency of the reference signal, with electrical signals provided by first and second predetermined groups of the light responsive elements in the second detector array. Signals are thereby provided which are processed and phase-detected to provide an output signal representative of the direction that the objective lens is displaced from a focus position at which the principal image is in sharpest focus.

7 Claims, 8 Drawing Figures

FIG. 3

DETECTING APPARATUS FOR DETERMINING WHEN IMAGE IS IN FOCUS

CROSS REFERENCES TO RELATED APPLICATIONS

Subject matter disclosed but not claimed herein is disclosed and claimed in the following copending applications:

Serial No. 377,809, filed July 9, 1973.
Serial No. 377,810, filed July 9, 1973.
Serial No. 380,500, filed July 18, 1973.

BACKGROUND OF THE INVENTION

1. Field of the Invention

The present invention relates to optical systems. More specifically, it relates to an automatic focus detecting system for use in automatically focussing an image of an object on a predetermined image plane.

2. Description of the Prior Art

There have been numerous efforts to provide means whereby a camera, either a still camera or a motion picture camera, may be made to focus automatically on the object which is being photographed. These have included means for evaluating the contrast of focussed and non-focussed images, means for measuring the angle of one or more beams of light projected from the camera to the object, means for analysing the frequency components of an image as a function of focus, and mechanical or electromechanical means such as a pendulum actuated system. For one reason or another, none of the foregoing systems have proved to be entirely satisfactory for use in modern, relatively small hand-held cameras especially when used in connection with a servo system.

For example, in those systems which provide means for evaluating the contrast components of the image, it is required that the analysis images achieve an exact focus in synchronism with the exact focus of the principal image. If auxiliary lenses are used to provide the analysis images, these must be matched to the focal characteristics of the main lens. The same holds for systems which evaluate the frequency components of the analysis images.

Those devices employing one or more light beams directed to the object, and those using a pendulum to effect automatic focus, require complex mechanical linkages. Further, some of the prior art systems provided a focus signal indicative of the displacement of a focussing lens from a proper focus position but did not give any indication as to the direction of such displacement and therefore were not compatible with sero-systems required to maintain focus.

SUMMARY OF THE INVENTION

It is, accordingly, an object of the present invention to provide an improved automatic focus detecting system for cameras.

It is another object of the present invention to provide an improved automatic focus detecting system as set forth which obviates the shortcomings of the prior art systems.

It is a further object of the present invention to provide an improved automatic focus detecting system as set forth which is simple in structure and operation.

It is still another object of the present invention to provide an improved automatic focus detecting system as set forth which generates an output signal representative of the direction that an objective lens is displaced from the best focus position for any given object.

It is yet another object of the present invention to provide an improved camera with an automatic focussing system.

In accomplishing these and other objects, there has been provided, in accordance with the present invention, an improved automatic focussing system wherein means are provided for producing a pair of auxiliary images which, in turn, impinge on first and second detector means. Each detector means comprises a plurality of light responsive elements which are displaced along the detector means and so arranged that distribution of the light patterns of the two images are sensed and compared. Means are provided for moving one of the auxiliary images with respect to the associated detector means. A switching circuit, driven by a reference signal of a predetermined frequency, compares signals from the elements of the first detector means, alternately at the predetermined frequency, with signals provided by first and second groups of elements in the second detector means. Further means are provided which correlate the signals provided by the comparison of the two images with the reference signal to produce a control signal. The control signal, in turn, is used to control a servo system adjusting the position of one of the images with respect to its corresponding detector means. The positioning of the moving auxiliary image is coordinated with a focussing means which concurrently varies the focus of a principal image. The control signal is representative of the direction that the focussing means is displaced from the focus position at which the principal image is in optimum focus.

BRIEF DESCRIPTION OF THE DRAWINGS

A better understanding of the present invention may be had from the following detailed description when read in connection with the accompanying drawings in which.

DESCRIPTION OF THE PREFERRED EMBODIMENTS

Figure 1:
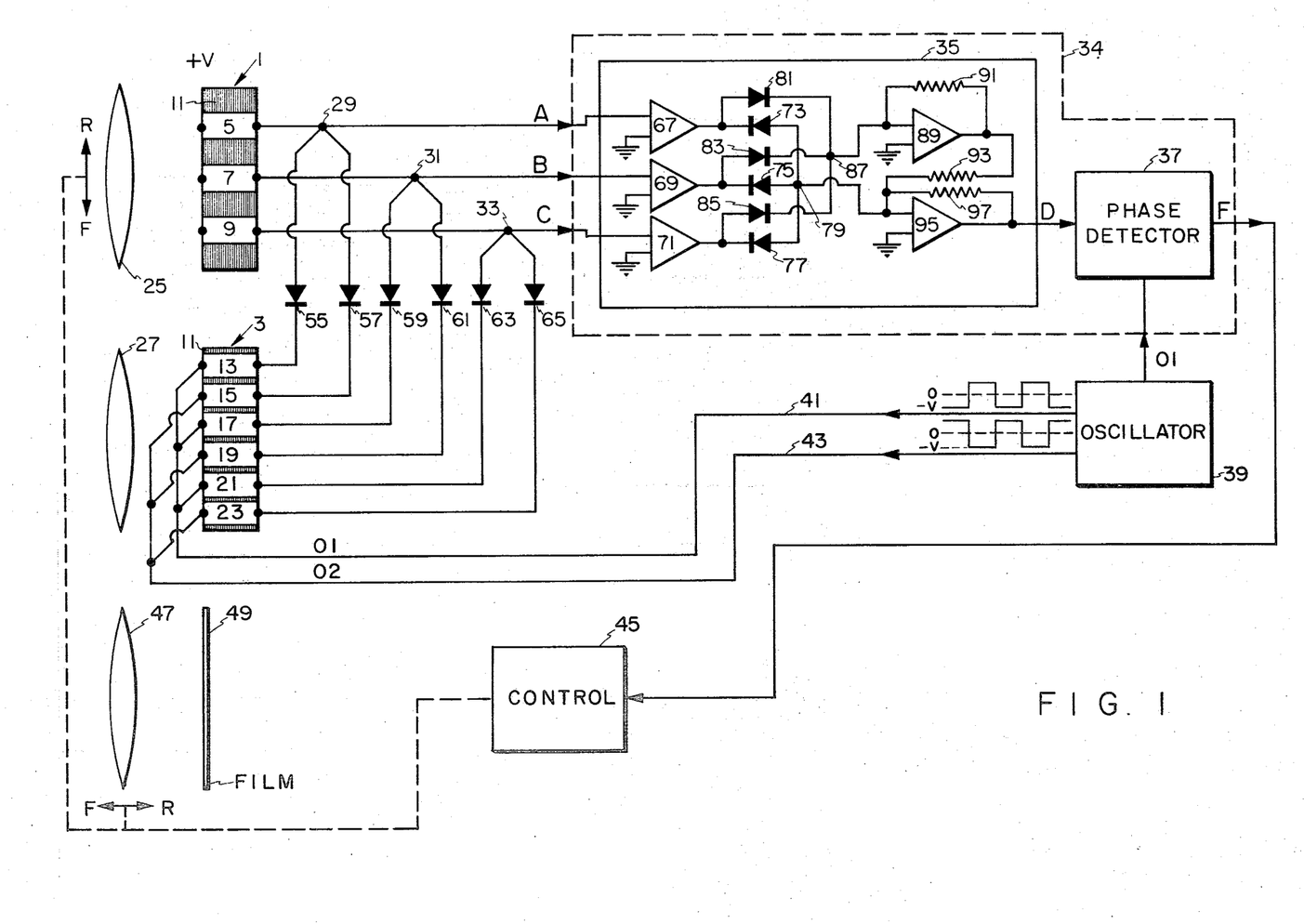
FIG. 1 is a schematic diagram showing one embodiment of the present invention.

Referring to the drawings in more detail, FIG. 1 shows a first detector means 1 and a second detector means 3. Each of the detector means is made up of an array of a plurality of individual light responsive elements. The elements are preferably linearly displaced though such linear displacement is not essential. In the present example, the second detector means 3 includes twice as many light responsive elements as the first detector means 1. The first detector means 1 is shown with three light responsive elements 5, 7 and 9 which are separated from each other by an insulating material 11. The second detector means in the present example includes six light responsive elements 13, 15, 17, 19, 21 and 23. The light responsive elements in the second detector means 3 are also separated from each other by the insulating material 11. The light responsive elements in the exemplary embodiment of FIG. 1 are photo resistive elements and therefore the resistance of each element decreases as the light or radiation falling thereon increases. The elements in the first detector means 1 have a common connection to a +V reference potential. Although but three and six light responsive elements are shown in the first and second detector means 1 and 3, respectively, it is noted that any number of light responsive elements may be used with the detector device shown in FIG. 1 as long as the number of elements in one of the detector means is twice the number of the elements in the other detector means. A first auxiliary lens means 25 and a second auxiliary lens means 27 represent first and second means for forming first and second auxiliary images of a relatively distant object. The two detector means 1 and 3 are shown as being positioned in coplaner relationship with respect to each other. Although that arrangement is preferred, it is not essential. Although the schematic representation in FIG. 1 shows the faces of the light detector means 1 and 3, it is understood that the faces which include the light responsive elements of the first and second detector means 1 and 3 are, in actual construction, facing the first and second auxiliary lens means 25 and 27, respectively, to receive the radiation passing therethrough.

A first auxiliary image is therefore formed on the face of the first detector means 1 from the radiation passing through the first lens means 25. A second auxiliary image is formed on the face of the second detector means 3 from the radiation passing through the second auxiliary lens 27. It is not essential that the first and second images be precisely focussed at the plane of the detectors; it is only necessary that the light pattern distribution of the two images can be matched with regard to the respective detectors. In that connection, the two auxiliary images may be significantly out of focus at the plane of the detectors so long as each light pattern formed on the plane of the detectors exhibits a distinguishable spatial radiation distribution.

As illustrated, both auxiliary lens means 25 and 27 are arranged to form auxiliary images of the same portion of the remote object or scene. It will be appreciated that both of the optical means including the first and second auxiliary lenses 25 and 27 are arranged to respond to a relatively small angle of view, for example on the order of 1 to 10 degrees. The image formed by the lens means 27 will be centered with respect to the second detector means 3, the second lens means and the second detector means being positionally fixed and coordinated with respect to a reference point in an associated view finder (not shown). That image will so condition each of the light sensitive elements of the second detector means 3 that a signal will be produced by each of those elements. Each of the signals will have a magnitude which is a function of the light level of that portion of the image which impinges on the individual element. As the first auxiliary lens means 25 is moved in a direction parallel to that of the linear displacement of light responsive elements in the first detector means 1, the light distribution pattern falling on the first detector means 1, which is substantially the same as the light distribution pattern formed on the second detector means 3 through the second auxiliary lens 27, will be shifted in the direction of the linear displacement of the individual light responsive elements in the first detector means 1 as is more clearly illustrated in FIGS. 2A, 2C, and 2E. Each light responsive element 5, 7 and 9 of the first detector means 1 has a pair of corresponding light responsive elements 13 and 15, 17 and 19, and 21 and 23, respectively, in the second detector means 3. The correspondence is based on the relative location of each light responsive element with respect to the particular array or detector means of which it forms a part. As hereinbefore mentioned, each light responsive element in the first detector means 1 has a common terminal connected to a first reference potential +V. The other terminals of the light responsive elements 5, 7 and 9 in the first detector means 1 are connected to common points 29, 31 and 33, respectively, which are in turn connected to a signal processing circuit 35. The common points 29, 31 and 33 associated with each of the light responsive elements 5, 7 and 9 of the first detector means 1 are also connected by separate electrical paths to the corresponding pair of photo responsive elements in the second detector means 3. The common point 29 associated with the light responsive element 5 is connected through the anode to cathode path of a diode 55 to one terminal of the light responsive element 13 in the second detector means 3. The common terminal 29 is also connected through the anode to cathode path of a separate diode 57 to one terminal of the other light responsive element 15 of the pair of light responsive elements in the second detector means. Similarly, the common point 31 is connected through the anode to cathode path of separate diodes 59 and 61 to a second pair of associated light responsive elements 17 and 19 of the second detector means 3. The common point 33 is connected through the anode to cathode paths of two other diodes 63 and 65 to the third pair of light responsive elements 21 and 23, respectively, in the second detector means 3. The common points 29, 31 and 33 provide resultant signals A, B and C to a signal conditioning circuit 34. The signal conditioning circuit 34 includes the signal processing circuit 35 which provides an output signal D to a phase detector circuit 37. The phase detector circuit 37, within the signal conditioning circuit 34, also receives an input signal 01 from an oscillator circuit or timing signal generating means 39. In addition to the oscillatory signal 01, the timing signal generating means 39 also provides a second oscillatory signal 02. The first and second oscillatory signals 01 and 02 are square wave signals in the present example, the second oscillatory signal 02 being 180° out of phase with respect to the first oscillatory signal 01. Both oscillatory signals 01 and 02 are centered on a zero volt axis and deviate above and below the zero volt level by an amount equal to the reference potential V.

The oscillator circuit or timing signal generating means 39 also applies the oscillatory signals 01 and 02 to the second detector means 3 through two output leads 41 and 43, respectively. The output lead 41 applies the first timing or oscillatory signal 01 to the first, third and fifth light responsive elements 13, 17 and 21 of the second detector means 3. The oscillator output lead 43 applies the second timing or oscillatory signal 02 to the second, fourth and sixth light responsive elements 15, 19 and 23 of the second detector means 3. Since the timing signals 01 and 02 are 180° out of phase, and since the timing signals are only operative to fowardly bias the diodes connecting the light responsive elements of the first and second detector means when those signals are in the low state, i.e. applying a −V potential to the connected light responsive elements, at any given point in time, either the first, third and fifth diodes 55, 59 and 63 are forwardly biased, or the second, fourth and sixth diodes 57, 61 and 65 are forwardly biased. When the first, third and fifth connecting diodes 55, 59 and 63 are forwardly biased, the first, third, and fifth light responsive elements 13, 17, and 21 will affect the resultant signals appearing at the common points 29, 31 and 33. At that time, the second, fourth, and sixth connecting diodes will be reverse biased thereby precluding the second, fourth and sixth light responsive elements 15, 19 and 23 in the second detector means 3 from affecting those resultant signals, respectively. Similarly, when the second, fourth and sixth connecting diodes 57, 61 and 65 are forward biased the first, third and fifth connecting diodes 55, 59 and 63 are reverse biased and the second, fourth and sixth light responsive elements 15, 19 and 23 will affect the resultant signals appearing at the common points 29, 31 and 33, and the first, third and fifth light responsive elements 13, 17 and 21 will have no effect on the resultant signals appearing at the common points 29, 31 and 33. Therefore, the effect of the application of the timing signals 01 and 02 to the second detector means 3 is to switch, alternately, at the predetermined frequency of the signals 01 and 02, the effective or operative light responsive elements in the second detector means 3 from a first group comprising the first, third and fifth light responsive elements 13, 17 and 21 to a second group comprising the second, fourth and sixth light responsive elements 15, 19 and 23. Therefore, the portions of the light distribution pattern of the second auxiliary image seen by the second detector means 3 are cyclically changed in accordance with the timing signals provided by the timing signal generating means 39. During one half cycle of the timing signals, one area of the light distribution pattern is seen, and during the other half cycle another portion is seen. In other words, the illumination falling on the light responsive elements 5, 7 and 9 of the first detector means 1 is alternately compared with the illumination falling on the corresponding light responsive elements 13 and 15, 17 and 19, and 21 and 23, of the second detector means 3. During one half cycle of the oscillatory signals, the illumination falling on the first light responsive element 5 of the first detector means 1 is compared to the illumination falling on the first light responsive element 13 of the second detector means 3, and during the other half cycle of the oscillator signals the illumination falling on the light responsive element 5 of the first detector means 1 is compared with the illumination falling on the second light responsive element 15 of the second detector means 3. A similar comparison occurs with respect to the second and third light responsive elements 7 and 9 of the first detector means 1 and the third, fourth, fifth and sixth light responsive elements 17, 19, 21 and 23 of the second detector means 3. Those comparisons provide the resultant signals A, B, and C at the first, second, and third common points 29, 31, and 33 which are, in turn, applied to the signal processing circuit 35. The frequency of the oscillatory signals is greater than the frequency of the cyclic movement of the first auxiliary lens means 25. Therefore, while the first auxiliary lens means 25 moves from one extreme position to another, a plurality of switching cycles will be accomplished in response to the oscillatory signals 01 and 02.

The phase detector circuit 37 provides an output signal which is applied to a control circuit 45. The control circuit 45 is operable to move the first auxiliary lens means 25 between the extreme positions F (forward) and R (reverse) and, conjointly, move a principal lens means 47 between corresponding extreme positions F and R. The movement of the principal lens or objective lens 47 is operable to vary the condition of focus of a principal image formed on a light sensitive film 49 from a relatively distant object.

The signal processing circuit 35 is effective to rectify or take the absolute value of the input signals applied thereto, and to sum those rectified signals thereby providing the signal D to the phase detector circuit 37. The signal processing circuit 35 includes first, second and third amplifiers 67, 69 and 71, respectively. Each of the amplifiers 67, 69 and 71 has one input terminal thereof connected to a common reference potential and the other input terminal arranged for receiving one of the input signals A, B, or C applied to the signal processing circuit 35. Each of the amplifiers 67, 69 and 71 has its output terminal connected through the anode to cathode path of an associated diode 73, 75 and 77, respectively, to a first common connection point 79, and also through the cathode to anode path of another associated diode 81, 83 and 85, respectively, to a second common connection point 87. The common connection point 87 is connected to a first input terminal of an amplifier 89, the other input terminal of which is connected to the common reference potential. The output terminal of the amplifier 89 is connected through a feedback resistor 91 to the first input terminal thereof. The output terminal of the amplifier 89 is also connected through a coupling resistor 93 to a first input terminal of another amplifier 95. The first input terminal of the amplifier 95 is also connected to the first common connection 79; the second input terminal of amplifier 95 is connected to the common reference potential. The output terminal of the amplifier 95 is connected back to the first input terminal thereof through a feedback resistor 97. The output signal of the amplifier 95 provides the signal processing circuit output signal D which is applied to the phase detector circuit 37.

Figure 2A:
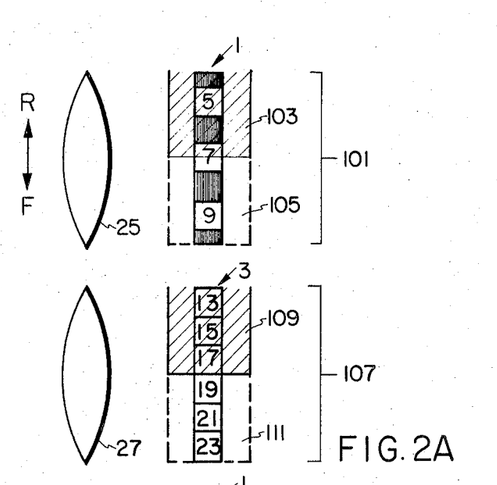
FIGS. 2A through 2F are schematic diagrams and pulse charts which are helpful in explaining the operation of the embodiment shown in FIG. 1.
Figure 2B:
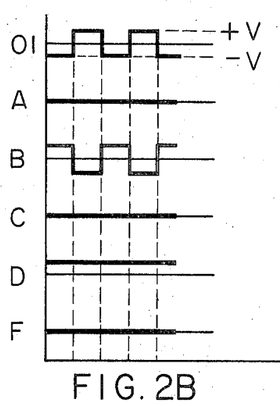
Figure 2C:
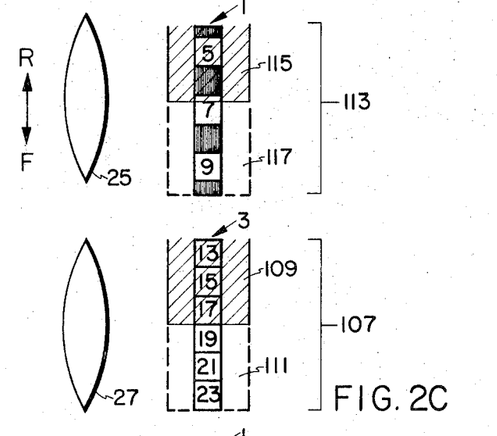
Figure 2D:
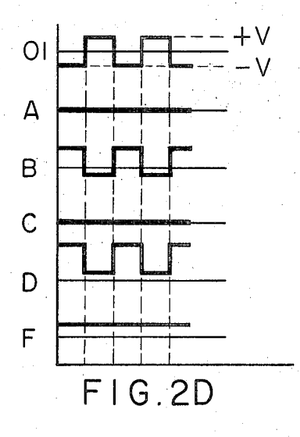
Figure 2E:
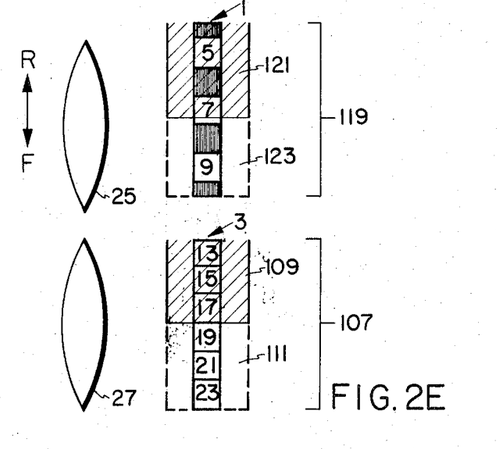
Figure 2F:
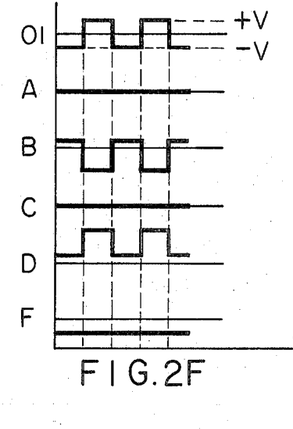

In explaining the operation of the embodiment shown in FIG. 1, reference is had to FIGS. 2A through 2F wherein components similar to those in FIG. 1 are shown with identical numerical designations. FIGS. 2A, 2C and 2E show a portion of the focus detecting apparatus of the present invention with the first auxiliary lens 25 shown in three different positions. FIGS. 2B, 2D and 2F show the wave shapes of the significant signals generated when the first auxiliary lens 25 is in the three positions shown in FIGS. 2A, 2C and 2E, respectively. Referring back, for a moment, to FIG. 1, it is apparent that the relative position of the light distribution pattern of the first auxiliary image with respect to the first detector means 1 is a function of the distance from the detecting apparatus to the object the image of which is to be properly focussed through the principal or objective lens 47 onto the light sensitive film 49. As that distance increases, the first and second distribution patterns created by the first and second auxiliary images will move toward each other on the first and second detector means, respectively. Therefore, when focussing on an object which is a given distance away from the focus detecting apparatus, the position to which the first auxiliary lens 25 has to be moved in order to provide a positional identity of the light distribution patterns created by the first and second auxiliary images upon the first and second light detector means 1 and 3 is a measure of the distance that the object is displaced from the focus detecting apparatus. The principal or objective lens 47 is so conjointly moved with the first auxiliary lens 25 that when the first and second light distribution patterns are in relative positional identity with respect to the first and second detector means, respectively, the principal or objective lens 47 is in a position effective to properly focus an image of the object on the light sensitive film 49 (FIG. 1).

FIGS. 2A, 2C and 2E show the auxiliary lens system with the first auxiliary lens 25 in three different positions. The distance between the focus detecting apparatus and the object the image of which is to be focussed on the light sensitive film 49 is the same in all three cases. In FIG. 2A a light distribution pattern 101 falling on the first detector means 1 includes, as a simplified example, a shaded portion 103 and an unshaded portion 105. The shaded portion 103 covers the light responsive element 5 and half of the light responsive element 7. A second light distribution pattern 107 created by the second auxiliary image falling on the second detector means also includes a shaded area 109 and an unshaded area 111. The shaded area 109 covers light responsive elements 13, 15 and 17 while the unshaded area 111 falls upon light responsive elements 19, 21, and 23. Each light distribution pattern is positioned on its associated detector means in relatively the same position with respect to that detector means, which, as hereinbefore noted, is indicative of the fact that the principal lens 47 is in its proper focus position. The shaded portion 103 of the first light distribution pattern 101 covers the top half of the first detector means 1; the shaded portion 109 of the second light distribution pattern 107 covers the top half of its associated detector means 3. As hereinbefore mentioned when the oscillatory signal 01 is in the low state, i.e. at −V volts, the light responsive elements 5 and 13 are effectively series connected between +V and −V volts. Similarly, the light responsive elements 7 and 9 are serially connected with corresponding light responsive elements 17 and 21 between +V and −V volts. When the oscillatory signal 01 is in the low state the oscillatory signal 02 is in the high state thereby back biasing the diodes 57, 61 and 65. When the diodes 57, 61 and 65 are back biased the light responsive elements to which they are connected in the second detector means 3 are inoperable to effect the resultant signals A, B, and C which are applied to the signal processing circuit 35. When the oscillatory signal 01 is low, the resultant signal A is determined by the ratio of the resistances of the photo responsive elements 5 and 13. Since the illumination on both of those light responsive elements is the same, their resistances are the same, the common point 29 will exhibit a voltage level of zero volts as shown in FIG. 2B. Also while the oscillatory signal 01 is low, the signal B appearing at the common point 31 between the light responsive elements 7 and 17 is slightly positive since the light responsive element 7 is only partially shaded and its resistance is therefore lower than the resistance of the light responsive element 17 which is completely shaded. Therefore, the voltage division between +V volts and −V volts is not equal as it was when the light responsive element 5 and the light responsive element 13 were compared. The resistance of the light responsive element 7 is less than the resistance of the light responsive element 17 and therefore the potential of the common point 31 between those two light responsive elements is slightly positive. Further, when the oscillatory signal 01 is low, the potential at the common point 33 between the light responsive elements 9 and 21 is zero since both are equally illuminated and therefore have the same resistance. Thus, +V volts is dropped across the photo responsive element 9 and −V volts is dropped across the photo responsive element 21; the potential at the common point 33 which connected the two photo responsive elements is zero. Since the processing circuit 35 acts to rectify the signals A, B and C and add those rectified values together, the value of the output signal D from the signal processing circuit 35 is slightly positive as shown in FIG. 2B.

When the oscillatory signal 01 goes high, the diodes 55, 59 and 63 are reverse biased thereby precluding the light responsive elements 13, 17 and 21 from affecting the value of the resultant signals A, B and C appearing at the common points 29, 31 and 33. However, when the oscillatory signal 01 goes high, the oscillatory signal 02 goes low and thereby forwardly biases the diodes 57, 61 and 65. When the oscillatory signal 01 goes high and the oscillatory signal 02 goes low, the light responsive elements 15, 19 and 23 become the operative elements in the second light detector means 3 and the +V to −V potential is dropped across the light responsive elements 5 and 15, 7 and 19, and 9 and 23, respectively.

Since both light responsive elements 5 and 15 are in the shaded portion of their respective light distribution patterns 101 and 107, equal potentials will be dropped across each one and the resultant signal A appearing at the common point 29 between the two photo responsive elements 5 and 15 will remain at zero volts. Since the light responsive element 7 is partially shaded its resistance will be greater than the resistance of the light responsive element 19 which is unshaded. Therefore, when the oscillator signal 01 is in the high state, the resultant signal B appearing at the second common point 31 between the light responsive elements 7 and 19 will assume a negative value equal in magnitude to the positive value assumed when the oscillatory signal 01 is in a low state. Therefore as the oscillatory signal 01 switches back and forth between its high and low states, the resultant signal B will switch back and forth between its low and high states, respectively, which are centered upon a zero potential. Since the light responsive element 9 and the light responsive element 23 have equal illumination falling thereon, the resultant signal C appearing at the common point 33 between those light responsive elements will continue at the zero volt level.

Therefore, as the oscillator signal 01 switches between its low and high states, the resultant signals A and C will remain at zero volts while the resultant signal B will switch between its high and low states, respectively. The signal processing circuit 35 will rectify the signal B and provide the signal D. Since the signal B deviates an equal amount in positive and negative directions from the zero potential reference, when the signal B is rectified the resultant signal assumes the form of a DC signal substantially equal in magnitudes to the peak value of the signal B. That signal D is supplied to the phase detector circuit 37. The phase detector circuit 37 compares the signal D to the oscillator signal 01. Since in the example shown in FIG. 2A, the signal D is a DC level signal having no oscillation or phase, the output signal F from the phase detector 37 is substantially zero volts which is indicative of the fact that the first and second light distribution patterns 101 and 107 are in a relative positional identity with respect to their associated detector means 1 and 3. As hereinbefore mentioned, that sensed positional identity of each light distribution pattern with its associated detector means 1 and 3 is indicative of the fact that the principal or objective lens 47 is in the proper position to focus the principal image of the object of interest on the light sensitive film 49. That is, when the first auxiliary lens 25 has been moved to a position where the light distribution patterns of the first and second auxiliary images are identically placed with respect to the first and second detector means, the principal or objective lens 47 is, at that time, in the proper focus position.

In FIG. 2C, the first auxiliary lens 25 has been moved in the reverse direction R so as to concurrently move the light distribution pattern 113, which includes a shaded area 115 and an unshaded area 117, upwardly on the first detector means 1. The light distribution pattern 107 falling on the second detector means 3 will remain in the same position with respect to the second detector means 3 since neither the second auxiliary lens 27 nor the object has been moved. The resultant signals A and C will remain unchanged at substantially zero volts as the oscillatory signal 01 changes states, since the light responsive element 5 and both of its corresponding light responsive elements 13 and 15 are in the shaded portion of their respective radiation distribution patterns and the light responsive element 9 and its corresponding light responsive elements 21 and 23 are both in the unshaded portion of their respective distribution patterns. However, the resultant signal B appearing at the second common point 31 will undergo a shift in its DC level as the first auxiliary lens 25 is moved above the position shown in FIG. 2A. When the oscillatory signal 01 is in its low state, the light responsive element 17 is serially connected with the light responsive element 7 between +V and −V volts. The light responsive element 7 will exhibit a lesser resistance than it did when the first auxiliary lens means 25 was in the position shown in FIG. 2A since, in FIG. 2C, the light responsive element 7 has more of its area in the unshaded portion of the radiation distribution pattern 113. Therefore, its resistance is proportionally less than the resistance of the light responsive element 7 under the conditions shown in FIG. 2A. Since in FIG. 2C the resistance of the light responsive element 7 is less, the signal B will assume a higher potential, i.e. a potential closer to the +V potential, than the signal B under the conditions in FIG. 2A. When the oscillatory signal 01 goes to its high state, the light responsive element 19 is serially connected with the light responsive element 7 between the +V and −V potentials. Since the light responsive element 19 is completely in the unshaded area of the radiation distribution pattern 107, its resistance will be less than the resistance of the light responsive element 7 which is partly in the shaded area of the light distribution pattern 113. Therefore, the resultant signal B at the second common point 31 will decrease to a potential only slightly less than zero when the oscillatory signal 01 switches into its high state. The resultant signal B under the conditions of FIG. 2C will assume the same general form, as the oscillatory signal 01 switches between its high and low states, as the resultant signal B under the conditions of FIG. 2A, except that the resultant signal B under the conditions of FIG. 2C will be centered about a slightly positive potential viz-a-viz the signal B under conditions of FIG. 2A which was centered about the zero axis. The signal processing circuit 35 will rectify the resultant signal B and provide the signal D for application to the phase detector 37. The phase detector 37 compares the phase of the signal D with the phase of the oscillator signal 01. Since 01 and D are 180° out of phase, a signal F of a positive magnitude is provided. The polarity characterization of the signal F i.e., positive, is indicative of the direction, i.e. reverse, that the lens system is displaced from its focus position.

In FIG. 2E the first auxiliary lens 25 is moved slightly in the forward direction F from its position as shown in FIG. 2A. Accordingly, the light distribution pattern 119, including a shaded portion 121 and an unshaded portion 123, is proportionately shifted downwardly. Thus the shaded portion of the light distribution pattern 119 covers more of the light responsive element 7 than the shaded portion 103 of the light distribution pattern 101 of FIG. 2A. The resultant signals A and C will remain unchanged at substantially zero volts as the oscillatory signal 01 switches between its high and low states since the light responsive element 5 and the light responsive element 13 and 15 are entirely within the shaded portions of their respective light distribution patterns, and the light responsive element 9 and both the light responsive elements 21 and 23 are in the unshaded portions of the light distribution patterns. Since the light responsive element 7 has more of its area covered by the shaded portion 121 of the light distribution pattern 119, its resistance will be proportionately greater than the resistance of the light responsive element 7 shown in FIG. 2A. Therefore, when the oscillatory signal 01 is in its low state, and the light responsive element 7 is serially connected with the light responsive element 17 between the plus and minus V potentials, the resultant signal B appearing at the second common point 31 will be only slightly positive since a greater potential drop appears across the light responsive element 17 than appears across the light responsive element 7. However, when the oscillatory signal 01 switches to its high state, thereby bringing the light responsive element 19 into a series connected relationship with the light responsive element 7 between the plus and minus V potentials, a greater potential drop appears across the light responsive element 7 since its resistance is greater. The resultant signal B will decrease to a point less than that of the low state of the resultant signal B under the conditions in FIG. 2A. Therefore, as the oscillatory signal 01 switches between its low and high states the resultant signal B will switch between a magnitude slightly greater than zero and a magnitude more negative than the low state of the signal B under the conditions of FIG. 2A, i.e. the resultant signal B will have the same wave shape as that shown in FIGS. 2B and 2D, however, in FIG. 2F the resultant signal B will be centered about a negative potential. The signal processing circuit 35 rectifies the resultant signal B to provide the signal D as shown in FIG. 2F. The phase of the signal D is compared with the phase of the oscillatory signal 01 by the phase detector 37 to provide an output signal F which, under the conditions shown in FIG. 2E, is a negative value DC signal. The polarity characterization of the signal F, i.e. negative, is indicative of the direction that the first auxiliary lens 25 is displaced from its focus position i.e. forward.

Therefore, the arrangement shown in FIG. 1 provides a focus signal indicative of the direction that the lens system is displaced from its focus position for any given object.

Figure 3:
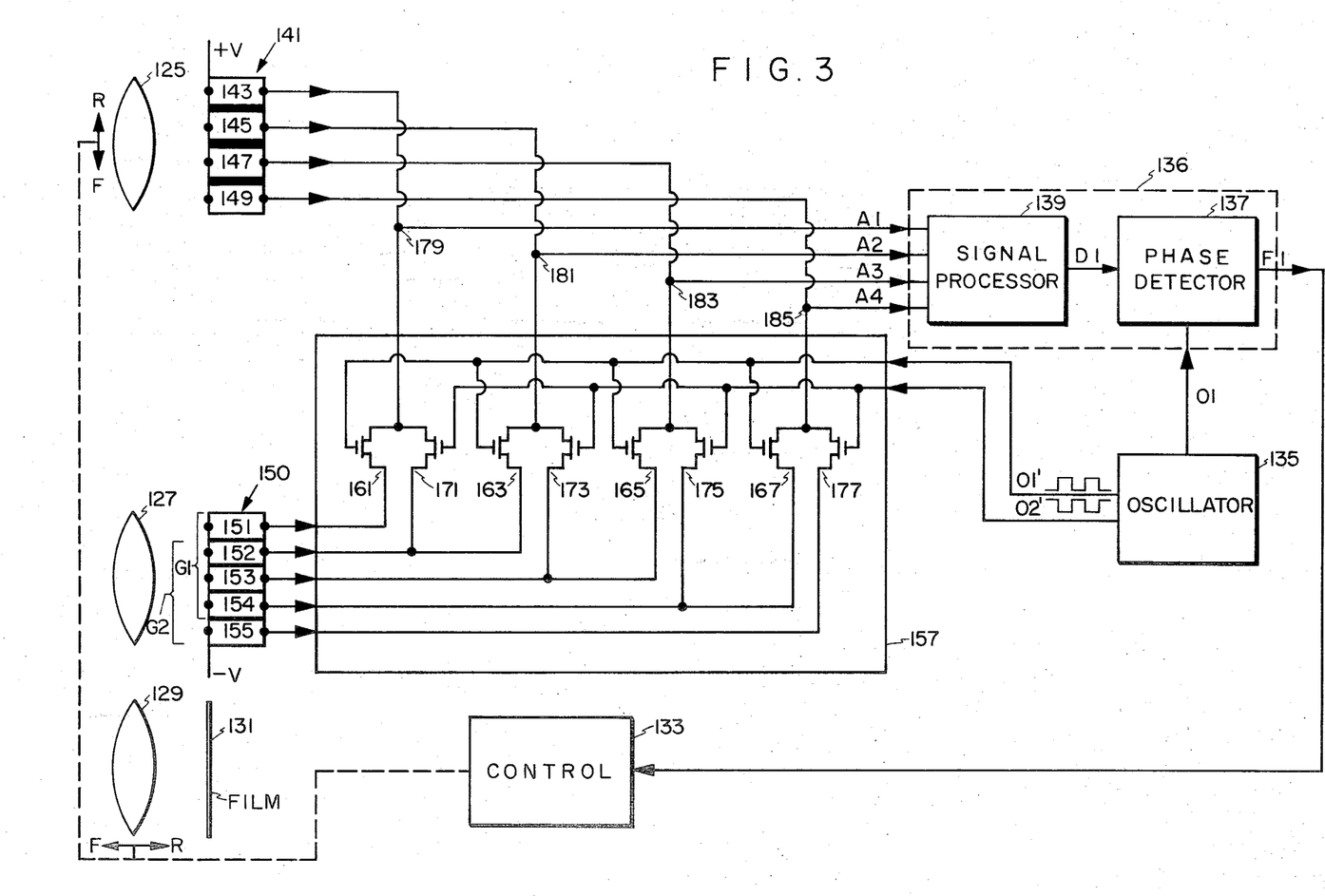
FIG. 3 is a schematic diagram showing another embodiment of the present invention.

The embodiment shown in FIG. 3 includes a first auxiliary lens 125, a second auxiliary lens 127 and a principal or objective lens 129, all similar to the corresponding structure shown in FIG. 1. The principal or objective lens 129 is movable conjointly with the first auxiliary lens 125 to focus an image of an object on the light sensitive film 131. FIG. 3 also shows a control circuit 133, an oscillator circuit 135, a phase detector circuit 137 and a signal processor circuit 139 all of which are similar to the corresponding structure shown in FIG. 1. The phase detector circuit 137 and the signal processor circuit 139 are included in a signal conditioning circuit 136. The signal processor 139 includes four channels instead of three as in FIG. 1, since it receives four resultant signals, A1, A2, A3, and A4. The oscillator circuit 135 provides two oscillatory signals 01' and 02' which are 180° out of phase with respect to each other. A first detector means or array 141 includes four light responsive elements 143, 145, 147 and 149. A second detector array or means 150 includes five light responsive elements 151, 152, 153, 154 and 155, in the present example. A terminal common to all four light responsive elements in the first detector array 141 is connected to a +V reference potential and a similar terminal common to all five light responsive elements in the second detector 150 is connected to a −V potential. The five light responsive elements in the second detector array are divided into two groups, the first group (G1) comprising the first four sequentially placed light responsive elements 151, 152, 153, and 154 and the second group (G2) comprising the four sequentially placed light responsive elements 152, 153, 154, 155. A switching means 157 includes two sets of switching devices. A first set of switching devices includes four field effect transistors (FET's 161, 163, 165, and 167. The second set of switching devices also includes four FET's 171, 173, 175 and 177. The first light responsive element in the first detector means 141 is connected to a common point 179 which is, in turn, connected to the drain electrodes of the first FET's 161 and 171 in the first and second groups of switching devices. The common point 179 also provides a resultant signal A1 for application to the signal processor circuit 139. The source of the first FET 161 in the first set of switching devices is connected to the first light responsive element 151 in the first group G1 of light responsive elements in the second detector means 150. Similarly, the source of the first FET 171 in the second set of switching devices is connected to the first light responsive element 152 in the second group G2 of light responsive elements in the second detector means 150.

The second light responsive element 145 in the first detector means 141 is connected to a common point 181, which provides a resultant A2 to the signal processor 139. The common point 181 is also connected to the drain terminal of the second FETs 163 and 173 in the first and second sets of switching devices. The source terminal of the second switching device 163 in the first set of switching devices is connected to the second light responsive element 152 in the first group G1 of light responsive elements in the second detector means 150. Similarly, the source terminal of the second switching device 173 in the second set of switching devices is connected to the second light responsive element 153 in the second group G2 of light responsive elements in the second detector means 150. The third light responsive element 147 in the first detector means 141 is connected to a common point 183, which provides a resultant signal A3 for application to the signal processor 139. The third common point is also connected to the drain terminals of the third FET's 165 and 175 in the first and second sets of switching devices. The source terminal of the third switching device 165 in the first set of switching devices is connected to the third light responsive element 153 in the first group G1 of light responsive elements in the second detector means 150, while the source terminal of the third switching device 175 in the second set of switching devices is connected to the third light responsive element 154 of the second group G2 of light responsive elements in the second detector means. The fourth light responsive element 149 is connected to a common point 185, which provides a resultant signal A4 to the signal processor 139. The common point 185 is also connected to the drain terminals of the fourth FET's 167 and 177 in the first and second sets of switching devices. The source terminal of the fourth FET 167 in the first set of switching devices is connected to the fourth light responsive element 154 of the first group G1 of the light responsive elements in the second detector means 150 and the source terminal of the fourth FET 177 in the second set of switching devices is connected to the fourth light responsive element 155 in the second group G2 of light responsive elements in the second detector means 150. The oscillator circuit 135 provides two oscillatory signals 01' and 02' which are 180° out of phase with respect to each other. The oscillatory signal 01' is applied to the gate electrodes of the FET's 161, 163, 165, and 167 in the first set or group of switching devices while the oscillatory signal 02' is applied to the gate electrodes of the FET's 171, 173, 175 and 177 in the second set or group of switching devices. Therefore, when the oscillatory signal 01' is high, the first set of switching devices 161, 163, 165 and 167 is rendered conductive, thereby connecting the light responsive elements in the first detector means 141 in series with corresponding ones of the light responsive elements of the first group G1 of light responsive elements in the second detector means 150 between the +V and −V reference potentials. Similarly, when the oscillator signal 02' is high, the second set of switching devices 171, 173, 175 and 177 is rendered conductive, thereby connecting in series the light responsive elements of the first detector means 141 with corresponding ones of the light responsive elements of the second group G2 of light responsive elements in the second detector means 150. Thus, as the oscillatory signals switch between their high and low states, the resistances of the light responsive elements in the first detector means 141 are cyclically, at the predetermined frequency of the oscillatory signals, compared with the light responsive elements in group G1 during one cyclic portion of the oscillatory signal, and with those in group G2 during another portion of the cyclic oscillatory signal. Therefore, the effective sensing area of the second array switches back and forth in response to the oscillatory signal from the first group G1 of light responsive elements 151, 152, 153 and 154 in the second detector array and the second group G2 of light responsive elements 152, 153, 154 and 155 in the second detector array 150. At any given time each light responsive element in the first detector means is serially connected to a corresponding light responsive element in the second detector array 150. For example, when the oscillatory signal 01' is high, the first light responsive element 143 in the first detector means 141 is serially connected to the first light responsive element 151 in the first group G1 of light responsive elements in the second detector means while, when the oscillator signal 01' is low, i.e. when the oscillator signal 02' is high, the first light responsive element 143 in the first detector means 141 is serially connected to the first light responsive element 152 in the second group G2 of light responsive elements in the second detector means 150.

In a manner similar to that explained in connection with FIGS. 2A, 2C and 2E, the embodiment shown in FIG. 3 provides a focus signal F1 which is indicative of the direction that the lens system is displaced from its focus position for any given object. More specifically the FET switching arrangement shown in FIG. 3 accomplishes a similar result as the diode switching arrangement accomplished in the structure disclosed in FIG. 1, i.e. different light sensitive areas are alternately activated to affect the resultant signals applied to the signal processor circuit 139 for providing an indication of when the first and second radiation distribution patterns are similarly positioned along the first and second detector means 141 and 150, respectively.

It is apparent that many different implementations may be provided in accordance with the present invention in addition to those shown in FIGS. 1 and 3. For example, instead of moving the first auxiliary lens conjointly with the principal or objective lens, the second auxiliary lens could be moved or either detector means could be so moved. Further, photovoltaic elements may be used in an arrangement in accordance with the present invention without departing from the spirit and scope of the present invention.

Thus, there has been provided, in accordance with the present invention, a focus detecting apparatus in which the annalysis images do not require the attainment of exact focus in synchronism with the exact focus of the principal image. The auxiliary lens of the focus detecting apparatus of the present invention need not be matched to the focal characteristics of the main objective lens and no complex mechanical linkages need be provided for the proper operation of the present focus detecing apparatus. Further, a focus signal is generated which is indicative of the direction that a principal lens is displaced from its focus position.

The embodiments of the present invention in which an exclusive property or privilege is claimed are defined as follows:

1. A focus position detecting apparatus for use with a principal lens means which is movable about a focus position at which a principal image of an object formed by said principal lens means is in sharp focus, said focus position detecting apparatus comprising:

first means defining a first optical path for radiation from the object and for forming a first auxiliary image of said object;

second means defining a second optical path for radiation from said object and for forming a second auxiliary image of said object, said second auxiliary image being spatially separated from said first auxiliary image;

first and second detector means positioned to receive radiation from said first and second auxiliary images, respectively;

means operable conjointly with said principal lens means for introducing relative motion between at least one of said auxiliary images and the associated detector means;

said first and second detector means each including an array of light responsive elements, each light responsive element being arranged to provide an electrical signal representative of the intensity of the radiation impinging thereon;

means defining first and second predetermined groups of elements in said second detector means;

timing signal generating means for providing a timing signal of a predetermined frequency;

means connected to said first and second detector means and responsive to said timing signal for comparing the electrical signals from said elements in said first detector means, alternately, at said predetermined frequency, with the electrical signals provided by said first and second predetermined groups of said elements in said second detector means, and providing a resultant signal for each such comparison; and signal conditioning means connected to said timing signal generating means and responsive to said resultant signals for providing an output signal representative of the direction said principal lens means is displaced from said focus position.

2. The focus position detecting apparatus as set forth in claim 1 wherein said signal conditioning means includes:

means responsive to said resultant signals for providing signals representative of the absolute values of said resultant signals;

means for summing said signals representative of the absolute values of said resultant signals to provide a summed signal; and means for sensing the relative phase of said summed signal with respect to said timing signal to characterize said output signal in a first manner when said summed signal and said timing signal are substantially in phase, and to characterize said output signal in a second manner when said summed signal and said timing signal are substantially out of phase, said first and second characterizations of said output signal being indicative of the direction said principal lens means is displaced from its focus position.

3. The focus position detecting apparatus as set forth in claim 2 wherein said phase sensing means further includes means for changing the polarity of said output signal in accordance with the relative phase of said summed signal with respect to said timing signal.

4. The focus position detecting apparatus as set forth in claim 1 wherein said first detector means includes a predetermined number of linearly aligned light responsive elements, said second detector means including at least one more than said predetermined number of light responsive elements, said elements of said second detector means being linearly aligned with respect to said linear alignment of said elements in said array of said first detector means, said first group of said light responsive elements of said second detector means comprising said predetermined number of sequentially placed elements beginning with the first element, said second group of light responsive elements comprising said predetermined number of sequentially placed elements beginning with the second element.

5. The focus position detecting apparatus as set forth in claim 1 wherein said signal comparing means includes:
   a first set of switching devices connected between said first and second detector means, said first set of switching devices being operable during a first cyclic portion of said timing signal for connecting said elements of said first detector means with corresponding elements of said first group of elements of said second detector means; and
   a second set of switching devices connected between said first and second detector means, said second set of switching devices being operable during a second cyclic period of said timing signal, for connecting said elements of said first detector means with corresponding elements of said second group of elements of said second detector means.

6. The focus position detecting apparatus as set forth in claim 5 wherein said switching devices are Field Effect Transistors.

7. An automatic focussing apparatus comprising:
   principal lens means for forming a principal image of an object;
   first means defining a first optical path for radiation from the object and for forming a first auxiliary image of said object;
   second means defining a second optical path for radiation from said object and forming a second auxiliary image of said object, said second auxiliary image being spatially separated from said first auxiliary image;
   first and second detector means positioned to receive radiation from said first and second auxiliary images, respectively;
   means operable conjointly with said principal lens means for introducing relative motion between at least one of said auxiliary images and the associated detector means;
   said first and second detector means each including an array of light responsive elements, each light responsive element being arranged to provide an electrical signal representative of the intensity of the radiation impinging thereon;
   means defining first and second predetermined groups of elements in said second detector means;
   timing signal generating means for providing a timing signal of a predetermined frequency;
   means connected to said first and second detector means and responsive to said timing signal for comparing the electrical signals from said elements in said first detector means, alternately, at said predetermined frequency, with the electrical signals provided by said first and second predetermined groups of said elements in said second detector means, and providing a resultant signal for each such comparison;
   signal conditioning means connected to said timing signal generating means and responsive to said resultant signals for providing an output signal representative of the direction said principal lens means is displaced from said focus position; and
   control means responsive to said output signal for positioning said principal lens means at said focus position.

* * * * *